United States Patent [19]
Fritz, Jr.

[11] 3,789,357
[45] Jan. 29, 1974

[54] SAFETY APPARATUS FOR DUMP TRUCKS
[76] Inventor: Albert W. Fritz, Jr., 411 Pear St., Pompano Beach, Fla. 33060
[22] Filed: Nov. 8, 1972
[21] Appl. No.: 304,722

[52] U.S. Cl.............. 340/53, 340/52 R, 200/61.44
[51] Int. Cl............................................. B60q 1/00
[58] Field of Search.. 340/52 R, 53; 200/39, 40, 41, 200/47, 61.44, 61.52, 61.43, 61.58

[56] References Cited
UNITED STATES PATENTS
| | | | |
|---|---|---|---|
| 3,464,755 | 9/1969 | Brown | 340/53 X |
| 3,535,679 | 10/1970 | Connors | 340/52 R |
| 3,528,055 | 9/1970 | Falco | 200/61.58 R X |
| 2,887,672 | 5/1959 | Morano et al. | 340/52 R |

Primary Examiner—Alvin H. Waring
Attorney, Agent, or Firm—Oltman and Flynn

[57] ABSTRACT

Safety apparatus for a dump truck for indicating both opening of the tailgate and lifting of the dump truck bed if the tailgate is closed. A first switch is closed by lifting the bed. A second switch, in series with the first switch, is normally closed and is opened by opening the tailgate. The first and second switches are connected in series with the distributor of the truck, to stall the engine if the bed is lifted while the gate is closed. A second safety circuit includes a switch connected to generate a signal, such as by lighting a lamp, when the tailgate is opened.

7 Claims, 2 Drawing Figures

PATENTED JAN 29 1974 3,789,357

SAFETY APPARATUS FOR DUMP TRUCKS

BACKGROUND OF INVENTION

This invention relates generally to a safety apparatus for dump trucks and, more particularly, to an electrical system to warn the driver when the tailgate of a dump truck is opened and, in addition, to prevent lifting the bed or body of the dump truck when the tailgate is closed.

Various problems are encountered by the operators of dump trucks which may result not only in an inadvertent dumping of the load being carried, but may also result in damage to the truck and injury to the operator.

For example, if the tailgate is opened while the dump truck is being driven, inertia upon stopping and starting may cause some of the contents to be deposited on the roadway.

If the dump truck bed is lifted to dump the contents while the tailgate is locked, the weight of the contents will shift the center of gravity of the dump truck and lift the cab and front wheels clear of the ground.

A prior art technique for solving the first part of this problem is disclosed in U. S. Pat. No. 2,887,672, issued to Morano et al. However, the Morano patent discloses a circuit for illuminating a lamp or sounding an alarm when the dump body or bed is lifted. It must be appreciated, that if a lamp is utilized and the lamp burns out, then the driver will still be subject to the same problems as before the installation of the patented warning signal.

Furthermore, this prior art technique has not proven satisfactory as the operator may be deliberately lifting the body of the dump truck because he believes the tailgate to be open.

It is, therefore, a principal object of the present invention to provide a new and improved safety apparatus for dump trucks.

It is a further object of the present invention to provide a safety circuit which cannot be inadvertently ignored by the operator of a dump truck.

It is yet another object of the present invention to provide a safety apparatus which automatically shuts off the engine of the dump truck if the dump truck bed is lifted while the tailgate is closed.

It is yet another object of the prevent invention to provide a safety apparatus which illuminates a warning lamp or other signal device when the tailgate of a dump truck is left open.

BRIEF DESCRIPTION OF THE DRAWINGS

The foregoing objects of the present invention, together with other objects and advantages which may be attained by its use, will become more apparent upon reading the following detailed description taken in conjunction with the drawings.

In the drawings, wherein like numerals identify corresponding parts.

DETAILED DESCRIPTION OF THE INVENTION

Figure 1:
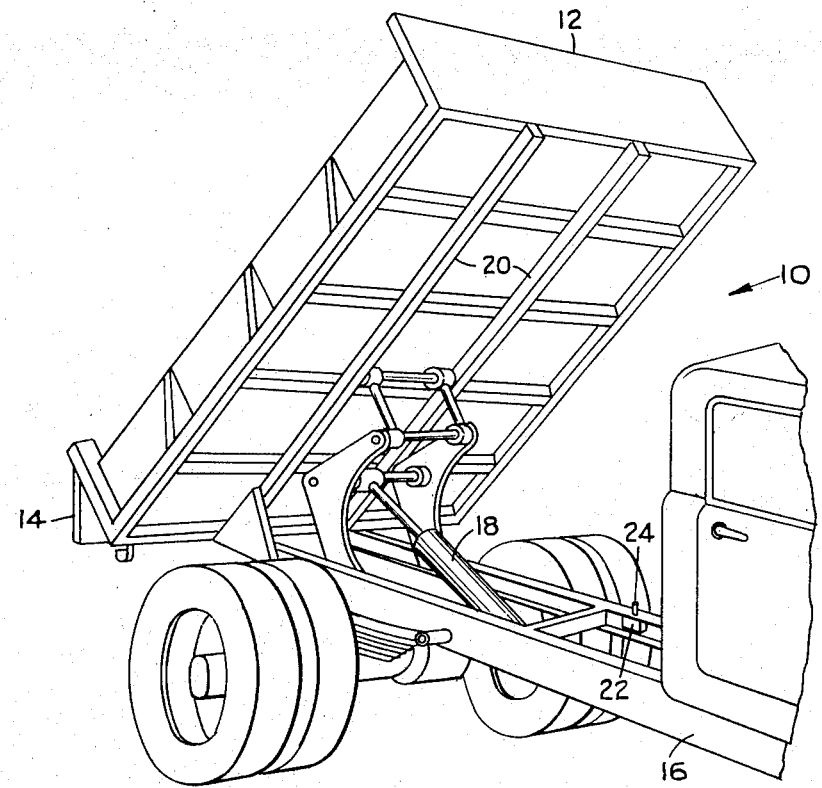
FIG. 1 is a partial perspective illustration of a dump truck incorporating the present invention.

The principles of the present invention may be employed in various applications where the physical position of multiple elements are critical. One environment where this invention has particular utility is a dump truck 10 having a dump truck bed or body 12 mounted thereto. A tailgate 14 is secured to the rear of the bed 12 and has a normally closed position to prevent material from being dumped out of the truck.

The dump truck 10 includes a plurality of longitudinal chassis rails 16 extending from the front of the truck to the rear and lifting means 18, such as hydraulic piston and cylinder, for lifting the bed 12 to permit the contents of the truck to be dumped out. The base of the bed 12 includes a plurality of longitudinal support rails 20.

The dump truck, of course, includes an engine and electrical means for providing signals to the engine, such as a conventional distributor.

A switch according to the principals of the present invention is disposed on one of the chassis rails 16. The switch 22 has a plunger 24 which extends above the plane of the chassis rails to be contactd by the support rails 20 when the bed is lowered against the chassis rails.

Figure 2:
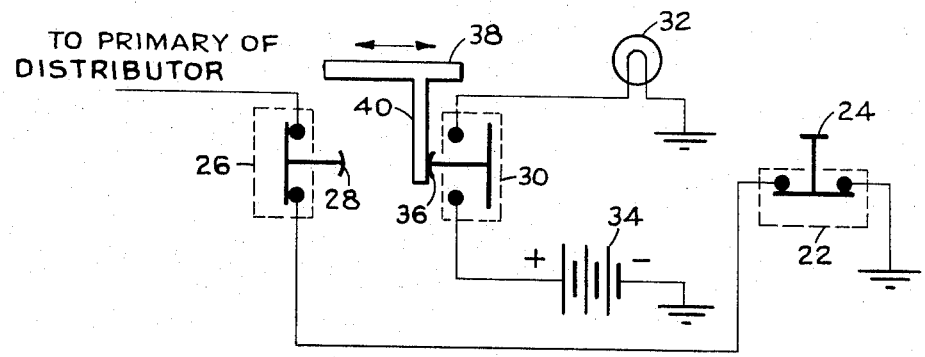
FIG. 2 is a schematic circuit illustrating the principles of the present invention.

Referring to FIG. 2, a first circuit includes the switch 22 with its plunger 24 and a second switch 26 having a plunger 28. The first and second switches 22, 28 are connected in series and also connected to the distributor of the engine.

A second circuit includes a third switch 30, a lamp 32 (or an alarm device) and a battery 34 which may be the battery associated with the engine. Switch 30 has a plunger 36.

A control bar 38 having a depending tab 40 may be secured to the tailgate for opening the tailgate. The location of the depending tab 40 with respect to the second switch 26 and the third switch 30 is such that when the tailgate is closed, tab 40 exerts a force to push plunger 36 of switch 30 inward. Upon moving the control arm 38 to open the tailgate, the depending tab 40 moves laterally to depress the plunger 28 of the second switch 26.

The operation of the circuits will now be explained with respect to the three switches which typically provide an open circuit when the respective plungers are in and a closed circuit when the plungers are out. Of course, it must be realized that any type of switch, be it magnetic or purely mechanical may be utilized as long as they provide the appropriate functions.

Upon the operator of the truck energizing the lifting means 18 to raise the truck bed, plunger 24 is released by the removal of the pressure or weight of the truck bed to provide a closed circuit through the switch 22.

Switch 26 is closed when its plunger 28 is out. Thus there is a closed circuit from ground through switch 22 to switch 26 to the distributor. This closed circuit shorts out the distributor and stalls the engine.

Prior to lifting the dump truck bed, had the operator opened the tailgate by sliding the control bar 38, the depending tab 40 would have acted against the plunger 28 to push the plunger in thereby opening switch 26.

With switch 26 open, by the opening of the tailgate, when switch 22 is closed by lifting the truck bed, the circuit to the distributor through the two switches is not closed. Therefore the distributor is not grounded out.

It must be appreciated that the physical location of the switch 26 and the control arm 38 need not be at the tailgate itself but may be located within the cab if there is included in the cab remote means for opening and locking the tailgate.

Referring to FIG. 2, there is also shown a second circuit including a lamp, the battery of the truck and a third switch 30 having a plunger 36. Switch 30 is also of the type which is closed when the plunger is out and open when the plunger is in.

In the position shown in FIG. 2, with the control bar 38 to the right and the depending tab against the plunger 36, the plunger is in and the circuit is open.

Upon moving the control bar 38 to the left by opening the tailgate, the depending tab 40 moves clear of the plunger 36 and into contact with the plunger 28. When the tab moves clear of plunger 36, plunger 36 moves out to close the circuit and illuminates the lamp 32. This lamp registers in the cab of the truck to indicate that the tailgate is open.

While it is appreciated that the lamp 32 may eventually burn out, the use of the tailgate motion as the activating means for the lamp 32 rather than the truck bed itself prevents the occurrence of tipping over the truck inadvertently if the lamp should be burned out. Thus, in the prior art where the truck bed activated the lamp, if the lamp were burned out, the truck bed could be lifted into a dumping position with the tailgate locked.

In the present invention, even if the lamp 32 burns out, the operator of the truck is assured that if the tailgate is locked, the operation of the lifting means will initially cause the truck engine to stall and prevent dumping of the truck contents or tipping over of the truck.

The foregoing is a description of one embodiment of the present invention and should be considered only as an explanation of the concept involved and not in a restricted sense. The invention may be further developed within the scope of the following claims.

What is claimed is:

1. In a dump truck or the like including an engine having a distributor, a dump body, a tailgate mounted on said body and having a normally closed position against said body, and means for lifting said dump body, the improvement comprising:

safety means for automatically shutting off the engine and said lifting means if said dump body is lifted while said tailgate is closed, said safety means including first and second switches, said first switch being closed by raising said dump body, and said second switch being closed when said tailgate is closed.

2. The apparatus of claim 1 wherein said first and second switches are connected in a series circuit to said distributor, said switches being closed when conditioned as aforesaid in order to complete said series circuit.

3. The apparatus of claim 2 wherein said second switch is opened when said tailgate is opened.

4. The apparatus of claim 3 and further including means including a third switch for generating a signal when said tailgate is opened.

5. The apparatus of claim 1 and further including means including a third switch for signalling the opening of said tailgate.

6. The apparatus of claim 5 wherein said first and second switches are connected in a series circuit to said distributor which circuit is completed when said dump body is raised and said tailgate is closed.

7. In a dump truck or the like including an engine having an electrical system, a dump body, a tailgate mounted on said body and having a normally closed position against said body, and means for lifting said dump body, the improvement comprising:

safety means connected to said electrical system for automatically shutting off the engine and said lifting means if said dump body is lifted while said tailgate is closed, said safety means including first and second switches, said first switch being actuated by raising said dump body, and said second switch being actuated when said tailgate is closed.

* * * * *